United States Patent

[11] 3,597,584

| [72] | Inventor | Karel Ter Haar<br>Christiaan Utrecht, Netherlands |
|---|---|---|
| [21] | Appl. No. | 845,552 |
| [22] | Filed | July 28, 1969 |
| [45] | Patented | Aug. 3, 1971 |
| [73] | Assignee | U. S. Philips Corporation<br>New York, N.Y. |
| [32] | Priority | July 31, 1968 |
| [33] | | Netherlands |
| [31] | | 6810908 |

[54] WELDING WIRE FOR THE ELECTRIC ARC WELDING IN AIR
3 Claims, No Drawings

[52] U.S. Cl. ............................................................. 219/146
[51] Int. Cl. ............................................................. B23k 35/22

[50] Field of Search... ........................................ 219/146;
117/202, 203, 204, 205, 206; 148/23, 24, 25, 26

[56] References Cited
UNITED STATES PATENTS

| 3,221,136 | 11/1965 | Freeth et al. | 117/205 |
| 3,413,164 | 11/1968 | Hillert | 148/26 |
| 3,453,142 | 7/1969 | Dorschu et al. | 219/146 |
| 3,466,417 | 9/1969 | Chapman et al. | 219/146 |

Primary Examiner—J. V. Truhe
Assistant Examiner—Lawrence A. Rouse
Attorney—Frank R. Trifari ABSTRACT: Welding electrode having an iron containing casing and a core containing calcium fluoride, titanium dioxide and potash feldspar.

WELDING WIRE FOR THE ELECTRIC ARC WELDING IN AIR

The invention relates to a bare electrode for the electric arc welding in air and to a method using such an electrode.

One of the problems which present themselves in electric arc welding is the occurrence of porosity of the weld. Several expedients have been found to solve this problem. In the electric arc welding with a bare electrode—which is to be understood to mean an electrode which is not coated with slag-forming and other constituents—which electrode may consist of solid metal or of a metal casing and a core which contains inter alia slag-forming constituents, an atmosphere of a protective gas is used for that purpose. The drawback is that the protecting gas has to be supplied separately (in cylinders) and that steps have to be taken for the supply of the protective gas to the welding arc and welding place. It is the object of the invention to provide a method which is simpler in performance and moreover is more economical and in which the use of a protective gas may be omitted. Welding takes place in air.

This object has been achieved by means of a welding electrode, (welding wire), consisting of a tubular casing on the basis of iron and a core of a very specific composition.

The invention relates to a welding electrode for the electric arc welding in air consisting of a tubular casing on the basis of iron, and a core containing slag-forming material and metal powder and is characterized in that the quantity of slag-forming material is 5 to 15 percent by weight of the electrode, that said material contains calcium fluoride, titanium dioxide and potash feldspar in quantities of 3.0—7.5 percent by weight, 0.75—3.0 percent by weight and 0.25—0.80 percent by weight, respectively, of the electrode, that said material may further contain calcium carbonate in a quantity of 0—7.5 percent by weight of the electrode, on the understanding that the ratio of the quantities by weight of calcium carbonate and calcium fluoride is always smaller than 1, and that the core further comprises ferrotitanium which contains 15—25 percent by weight of titanium in a quantity of 3.5—9.5 percent by weight of the electrode.

The invention also relates to a method of electric arc welding in air while using such an electrode.

It has been found that the electrode according to the invention is particularly suitable for hard-surfacing. It has surprisingly been established that a considerable part of titanium and carbon present in the electrode is found in the welding material. The great hardness and the large resistance to detrition of the welding metal is to be ascribed to this fact.

In addition to the above-mentioned characteristic constituents the core of the electrode may contain as a powder iron, alloy metals, for example, chromium or nickel, ferromanganese, silicon carbide, and carbon. The quantities of these substances may be adapted in known manner to the requirements to be imposed upon the welding metal.

It has been found that in these circumstances during welding with electrodes which contain more than 5 percent by weight, some smoke and stench development occurs. For this reason electrodes are preferred which contain less than 5 percent by weight of calcium fluoride. Preferred embodiments of the electrodes according to the invention are those in which the slag-forming material contains calcium fluoride, titanium dioxide and potash feldspar, in quantities of 3.5—4.5 percent by weight, 0.90—1.5 percent by weight and 0.35—0.50 percent by weight, respectively, of the electrode.

It has furthermore been found that the above-mentioned smoke and stench development can be suppressed by incorporating calcium carbonate in the slag-forming material. In order to obtain a readily flowing slag, the quantity by weight of calcium carbonate must be smaller than that of calcium fluoride. These substances are preferably used in a weight ratio of approximately 2:3.

Where in the description and claims quantities are state in percents by weight, this is to be understood to be percents by weight of electrode (casing+core).

In order that the invention may be readily carried into effect, it will now be described in greater detail with reference to the ensuing specific examples.

Hard surfacing was made with a welding wire (diameter 2.4 mm.) of the following composition

Example 1

| Core: | calcium fluoride | 5.5 |
| | titanium dioxide | 1.5 |
| | potash feldspar | 0.5 |
| | ferrotitanium | 4.6 (contains 20 percent by weight of Ti) |
| | ferromanganese | 0.5 (contains 80 percent by weight of Mn) |
| | iron powder | 24.4 |
| Casing: | soft steel | 63.0 |

As in the following example the contents are expressed in percents by weight of the welding wire.

In a few experiments direct current was used, in other experiments, alternating current was used during welding. Current strengths 300 to 600 Amp. Welding voltages 28—34 volt. The projecting length of the wire was 20—30 mm.

It has been found that the welding metal contains 0.07 percent C; 0.036 percent N; 0.55 percent Ti; 0.20 percent Si; and 0.60 percent Mn (percents by weight). The hardness of the welding metal was: Brinell 275. (Such a steel without titanium has a considerably lower hardness).

In a second example the composition of the welding wire (diameter 2.4 mm.) was as follows (in percents by weight of the wire)

Example 2

| Core: | Calcium fluoride | 5.5 |
| | Titanium dioxide | 1.5 |
| | Potash feldspar | 0.5 |
| | Ferrotitanium | 4.6 (contains 20 percent by weight of Ti) |
| | Ferromanganese | 0.5 (contains 80 percent by weight of Mn) |
| | Ferromolybdenum | 1.5 (contains 70 percent by weight of Mo) |
| | Ferrochromium | 7.2 (contains 70 percent by weight of Cr and 7 percent by weight of C) |
| | Iron powder | 15.7 |
| Casing: | Soft steel | 63.0 |

The Vickers-hardness of the welding metal was 590—700.

A suprisingly small quantity of the added carbon and alloy elements was burned in both examples. In the second example in which the total carbon content of the welding wire was 0.60 percent by weight the welding metal contained 0.50 percent by weight of carbon. The content of titanium of the welding wire was 0.93 percent by weight, that of the welding metal 0.53 percent by weight.

Below some examples are given of electrodes according to the invention in which the occurrence of smoke and stench development is suppressed. The first two examples relate to electrodes having a comparatively low content of calcium fluoride. The two other examples relate to electrodes in which calcium carbonate is included to reach the said result. The contents in this case are expressed in percents by weight of the electrode.

| | Example 3 | Example 4 |
|---|---|---|
| Calcium fluoride | 3.5 | 4.2 |
| Titanium dioxide | 0.95 | 1.2 |
| Potash feldspar | 0.40 | 0.45 |
| Ferrotitanium (contains | | |

|  | | |
|---|---|---|
| 21 percent of Ti) | 4.1 | 6.15 |
| Iron powder | 28.8 | 26.0 |
| Casing (soft steel) | 62.25 | 62.0 |

|  | Example 5 | Example 6 |
|---|---|---|
| Calcium fluoride | 4.0 | 5.0 |
| Calcium carbonate | 2.6 | 3.3 |
| Titanium dioxide | 1.6 | 1.75 |
| Potash feldspar | 0.4 | 0.45 |
| Ferrotitanium (contains 21 percent of Ti) | 4.0 | 4.0 |
| Iron powder | 26.0 | 23.5 |
| Casing (soft steel) | 61.4 | 62.0 |

The welding wire according to the invention is very suitable for the automatic and semiautomatic electric arc welding in air. It has been found that even no porosity occurs in the welding metal if during welding the arc is exposed to side wind. During welding only few sputters occur. Welds having a very smooth appearance can be obtained. The slag layer can easily be removed. Another important feature is that alternating current can be used with the welding electrode according to the invention.

What I claim is:

1. A welding electrode for the electric arc welding in air consisting of a tubular casing on the basis of iron and a core containing slag-forming material and metal powder, characterized in that the quantity of slag-forming material is 5—15 percent by weight of the electrode, that said material contains calcium fluoride, titanium dioxide and potash feldspar in quantities of 3.0—7.5 percent by weight, 0.75—3.0 percent by weight and 0.25—0.80 percent by weight, respectively, of the electrode, that said material further contains calcium carbonate in a quantity of up to 7.5 percent by weight of the electrode, on the understanding that the ratio of quantities by weight of calcium carbonate and calcium fluoride is always smaller than 1, and that the core further comprises ferrotitanium which contains 15—25 percent by weight of titanium in a quantity of 3.5—9.5 percent by weight of the electrode.

2. A welding electrode as claimed in claim 1, characterized in that the slag-forming material contains calcium fluoride, titanium dioxide and potash feldspar in quantities of 3.5—4.5 percent by weight, 0.90—1.5 percent by weight and 0.35—0.50 percent by weight, respectively, of the electrode.

3. A welding electrode of claim 1 wherein the ratio by weight of the calcium carbonate to the calcium fluoride present is approximately 2:3.

UNITED STATES PATENT OFFICE
CERTIFICATE OF CORRECTION

Patent No. 3,597,584 (PHN 3409)    Dated    August 3, 1971

Inventor(s) KAREL CHRISTIAAN TER HAAR

It is certified that error appears in the above-identified patent and that said Letters Patent are hereby corrected as shown below:

In the title page, "[72] Inventor Karel Ter Haar
                              Christiaan Utrecht, Netherlands"

should read:

"[72] Inventor Karel Christiaan Ter Haar
                              Utrecht, Netherlands"

Signed and sealed this 6th day of February    1973.

(SEAL)
Attest:

EDWARD M. FLETCHER, JR.                ROBERT GOTTSCHALK
Attesting Officer                       Commissioner of Patents